(No Model.)
J. E. WINDLE.
FRICTION CLUTCH DEVICE.
No. 497,506. Patented May 16, 1893.
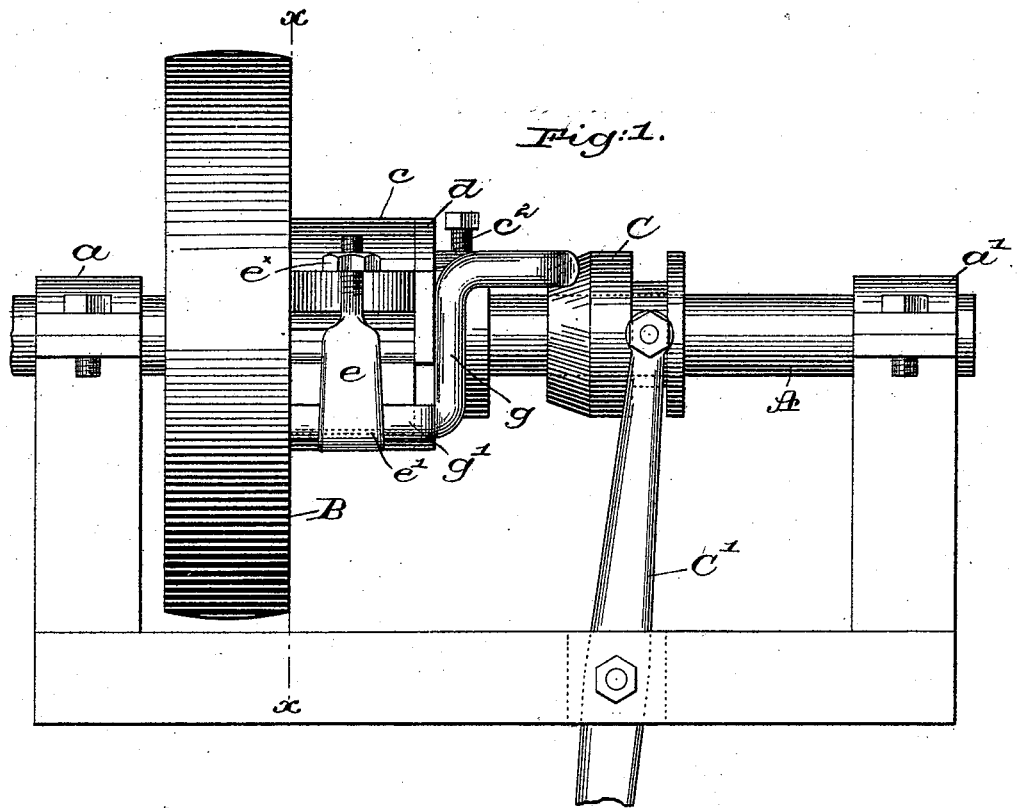
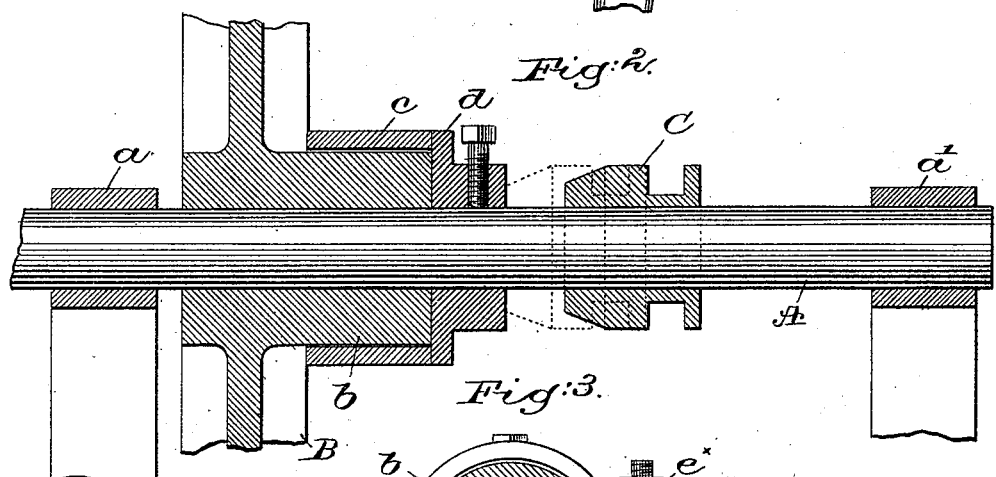
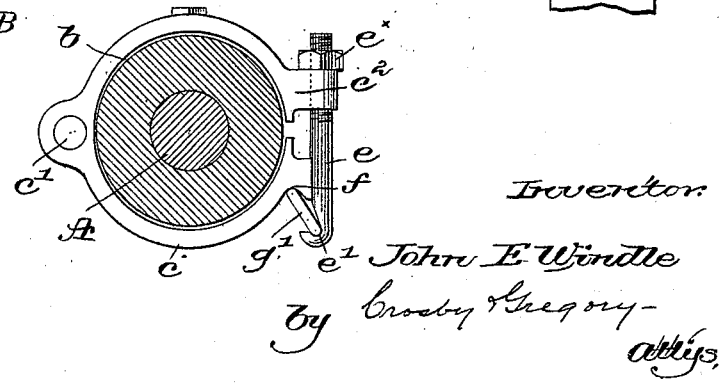
Witnesses.
Edward F. Allen.
Louis N. Lowell.
Inventor.
John E. Windle
By Crosby & Gregory
Attys.

UNITED STATES PATENT OFFICE.

JOHN E. WINDLE, OF WORCESTER, MASSACHUSETTS.

FRICTION-CLUTCH DEVICE.

SPECIFICATION forming part of Letters Patent No. 497,506, dated May 16, 1893.

Application filed September 9, 1892. Serial No. 445,420. (No model.)

*To all whom it may concern:*

Be it known that I, JOHN E. WINDLE, of Worcester, county of Worcester, State of Massachusetts, have invented an Improvement in Friction-Clutch Devices, of which the following description, in connection with the accompanying drawings, is a specification, like letters on the drawings representing like parts.

This invention has for its object the production of a friction clutch compact in arrangement, rapid and effective in operation, and composed of a small number of parts.

In accordance with my invention a rotatable shaft constitutes one member of a friction clutch device, and a loose pulley constitutes another member, in combination with a split collar attached to one member, a rocker, and a seat and a rest therefor, movement of the rocker contracting said split collar to cause the same to engage the other member of the device, substantially as will be described.

Figure 1 in side elevation represents a clutch pulley embodying my invention, the parts being shown in unclutched position. Fig. 2 is a vertical section thereof, the pulley being broken out to save space, and Fig. 3 is a section taken on the line $x$, $x$, Fig. 1.

The shaft A to be driven, supported in suitable bearings $a$ $a'$, and the cam or cone C movable on said shaft, and lever C' to actuate it are and may be of any usual or well known construction. I have herein shown a pulley B loose on the shaft A, said pulley having its hub $b$ prolonged to be engaged by the clamp $c$, herein shown as a split collar loosely surrounding the pulley hub $b$ and pivotally attached at $c'$ to a supporting disk or plate $d$ fast upon the shaft A. A link $e$ provided with a hook or notch $e'$ to form a rest is extended through an ear $c^2$ at one end of the collar $c$, the adjacent end thereof being provided with a seat $f$. To close the clamp I have provided a rocker having a blade-like end $g'$, sustained by and between the said seat and the notched part or rest $e'$ of the link $e$, as clearly shown in Figs. 1 and 3. The rocker has an arm $g$ located in the path of movement of the cone C.

In operation, the parts being as shown, if the cone C is moved into the position shown in dotted lines, see Fig. 2, the arm $g$ is engaged thereby and moved outwardly away from the shaft, the blade-like end $g'$ of the rocker being turned on the seat $f$ as a fulcrum thus drawing the link down, and thereby forcing the end $c^2$ of the collar $c$ toward the seat, clamping the collar around the hub $b$ and causing the shaft A to rotate in unison with the pulley. When the cone is withdrawn into its full line position, Figs. 1 and 2, the slight resilience of the split collar is sufficient to force its ends apart, and turn the arm $g$ toward the shaft, letting the clamp open to release the pulley.

In order to compensate for wear or to adjust the pressure of the clamp upon the hub, I have shown the upper end of the link $e$ as threaded, and an adjusting nut $e^x$ is screwed thereon, rotation of the latter shortening or lengthening the link, and thus increasing or decreasing the friction between the collar and hub, as desired. I have shown the outer faces of one end of the collar recessed to act as a guide for the link $e$.

It will be evident that the clutch herein shown and described can be used as a shaft coupling, by attaching the pulley or its equivalent to the end of an adjacent section of shafting to which it is desired to couple the shaft A.

I claim—

1. In a friction clutch device, a rotatable shaft constituting one member, and a loose pulley constituting another member, combined with a split collar having a seat and attached to one member, an adjustable rest to support one edge of a rocker, and a rocker held between said seat and rest, movement of the rocker contracting said split collar to cause the same to engage the other member of the device, substantially as described.

2. A rotatable shaft, a clamp composed of a split collar provided with a seat, a support for said collar, and a loose pulley, combined with a rest for a rocker, and a rocker supported in said seat and rest, movement of the rocker contracting said clamp to engage the pulley, substantially as described.

3. A rotatable shaft, a disk or plate fast thereon, and a clamp made as a split collar supported by said disk or plate, combined with a loose pulley to be engaged by said collar, a rocker-arm and an adjustable supporting link therefor to support one edge of the rocker, slight turning of the said rocker bringing said pulley and collar into frictional engagement, substantially as described.

4. A rotatable shaft, a split collar attached thereto, and a loose pulley having its hub surrounded by said collar, combined with means, including a notched link and a rocker having a blade-like end supported by and between said collar and link, and an arm, and a cam to move said arm to effect the clamping of the collar upon the pulley hub, substantially as described.

5. A rotatable shaft, a split collar attached thereto, provided with an ear and a seat, a link connected with said ear and provided with a rest, and a loose pulley, combined with a rocker supported by said seat and rest, and an arm to turn said rocker and thereby clamp the collar upon the pulley, substantially as described.

In testimony whereof I have signed my name to this specification in the presence of two subscribing witnesses.

JOHN E. WINDLE.

Witnesses:
FREDERICK L. EMERY,
JOHN C. EDWARDS.